3,487,024
ALLOY FILM
Peter H. Berning, Whitehouse, and Edward A. Small, Jr., Toledo, Ohio, assignors to Libbey-Owens-Ford Glass Company, Toledo, Ohio, a corporation of Ohio
No Drawing. Original application July 2, 1965, Ser. No. 469,337. Divided and this application June 10, 1968, Ser. No. 766,338
Int. Cl. G02b 5/26; C22c 5/00, 31/00
U.S. Cl. 252—300                                                3 Claims

ABSTRACT OF THE DISCLOSURE

The invention relates to a thin transparent light-modifying optical film of an alloy of gold, germanium and chromium.

---

This application is a divisional application of application Ser. No. 469,337, filed July 2, 1965, now U.S. Patent No. 3,400,006.

This invention relates generally to filmed or coated articles for use in various optical applications, and more particularly relates to glazing units provided with a novel thin optical film for modifying the light and solar radiation transmittance properties of the transparent substrates of such units.

Because of its inherent optical properties and chemical stability, gold has been used as a partially transparent film on glass, plastic, or other transparent substrates for its heat reflecting properties where it is desirable to have a fairly large portion of the visible spectrum transmitted. However, gold suffers from certain serious disadvantages when employed as a filming material, among which may be mentioned its softness and lack of adhesion. The adhesion may be improved by first depositing layers of compounds which adhere well to the substrate and the gold, but this complicates the process and does nothing to increase the durability of the gold film itself.

It has now been discovered, and the present invention is based upon such discovery, that a highly effective, partially transparent heat reflecting films may be produced from an alloy of gold, chromium and germanium. It has been found that a film of this alloy possesses very desirable optical properties, particularly for use in architectural applications, but does not exhibit the attendant disadvantages of pure gold films as above mentioned.

It is, therefore, a principal object of this invention to provide a novel filming or coating material for modifying the optical characteristics of a transparent substrate.

It is a further object of this invention to provide an improved article of manufacture including a durable, adherent heat reflecting film or coating.

Another object of the invention is the provision of transparent heat reflecting glazing units.

Other objects and advantages will in part be apparent and will in part appear hereafter.

For a better understanding of the nature and objects of the invention, reference should be had to the following detailed description which is intended only to illustrate and disclose but in no way limit the invention.

Generally stated, the novel article in accordance with this invention comprises a substrate of a transparent material and a thin, transparent, light modifying optical film adhered to at least one surface of said substrate, said film comprising an alloy consisting essentially of from 88 to 98 percent by weight gold, from 1 to 6 percent by weight germanium and from 1 to 6 percent by weight chromium. Preferably, the article additionally includes a transparent protective coating adhered to the free surface of said thin alloy film.

The films in accordance with the invention are deposited by vapor deposition in a vacuum, with the vapor sources preferred for use employing electron bombardment heating to vaporize the materials to be deposited as films or coatings upon the transparent substrates. The alloy of gold, chromium and germanium may either be evaporated rapidly from a molten pool, in which case some fractionization occurs leading to small changes in composition as the evaporation proceeds, or the evaporation may take place by dropping a powder of the alloy on a superheated refractory surface, in which case the mixture or alloy is deposited on the substrate without changing composition. A third method of deposition would be simultaneous evaporation of each component from several sources. The composition and total rate of deposition would be determined by the electrical energy supplied to the various sources.

In addition, the vacuum chamber may include several sources and associated electron bombardment heating means which may be activated at different intervals. For example, one or more of these sources may be utilized to lay down the gold alloy film and another source utilized to lay down the protective coating.

It has been found that the addition of at least 1 percent by weight of both of the alloying metals is necessary in order to secure an appreciable increase in durability and adhesion and to produce the desired light and solar energy transmittance properties. On the other hand, the addition of over about 12 percent by weight of alloying metals has resulted in the loss of some of the desired properties of the film and substrate. Particularly excellent results have been obtained with films comprising from 2 to 4 percent by weight chromium, from 2 to 4 percent by weight germanium and from 92 to 96 percent by weight gold.

The thickness of the gold alloy film will vary in accordance with the optical properties desired. In this connection and as previously mentioned, a preferred use for the articles in accordance with the invention is in architectural adaptations. Generally, for glazing units, film thicknesses in the range of from about 125 angstroms to 225 angstroms have been found desirable since these thicknesses produce visible light transmittances in the range of 35 to 50 percent while correspondingly limiting the solar energy transmittance to about 23 to 37 percent, respectively. This compares with visible light and total solar energy transmittances of about 89 percent and 80 percent, respectively, for one-quarter inch thick, clear polished plate glass. Greater film thicknesses may, of course, be employed where lower visible light transmittances would be desirable, it being noted that tinted or colored heat rejecting glass glazings having transmittances as low as 20 percent and in some instances even lower, which result with the use of thick glass sheets, e.g. nominal 0.5 inch thick, are employed in buildings where high strength is required.

As previously mentioned, articles in accordance with the invention may include a transparent protective layer or coating applied over the gold alloy film to protect the latter from physical damage. This is particularly important and in fact a definite requirement to enable the use of these alloy films in architectural applications wherein the filmed surfaces are glazed to the outside of the building or other structure and thus exposed to severe weathering conditions. In general, it is preferred that the protective coating comprise an oxide of an element selected from the group consisting of aluminum, silicon, titanium, cerium, zirconium and mixtures thereof and have a thickness in the range of from 0.1 mil to 1 mil, and preferably in the range of 0.25 mil to 1 mil.

The following examples constitute the best presently known mode for practicing the instant invention.

EXAMPLE 1

A 12 inch by 12 inch piece of nominal .125 inch thick ground and polished plate glass was washed with detergent and water and then cleaned with a chalk mixture and rubbed with clean cotton cloths. The resulting clean plate glass sample was placed in a vacuum chamber equipped with a high voltage discharge electrode, a glass heater, an electron beam evaporation source including a water cooled copper crucible and an optical monitoring system such as is generally used for controlling the thickness of films during vacuum deposition thereof. The chamber was next evacuated to a pressure of 20 microns of mercury and the plate glass sample further cleaned at this pressure by ionic bombardment through the application of 2000 volts DC to the glow discharge electrode for 10 minutes. The vacuum chamber was then further evacuated to $4 \times 10^{-5}$ torr.

The vapor source of water cooled copper crucible which previously had been loaded with particles of an alloy consisting of 95 percent by weight gold, 3 percent by weight chromium and 2 percent by weight germanium was then heated by activation of the electron beam source. Deposition of the gold alloy took place in 60 seconds at a pressure of $4 \times 10^{-5}$ torr and at a coating distance of 24 inches. The thickness of the film was controlled through the optical monitor to 190 angstron units. The glass had been heated to 300° F. by the glass heater prior to the deposition.

After the above noted gold alloy film thickness of 190 angstrom units was obtained, the electron beam evaporation source together with the glass heater were deactivated. The filmed glass sample was then allowed to cool, the pressure in the vacuum chamber raised to ambient pressure and the sample removed therefrom. Close visual inspection and handling of the filmed sample showed no cracks or defects in the gold alloy film. The film was found to be durable, resisting a rubbing pressure considerably greater than that sufficient to remove a pure gold film deposited directly upon glass, and possessed the following optical characteristics:

Illuminant C

| | Percent |
|---|---|
| Transmittance | 40.5 |
| Reflection—film side | 34.2 |
| Reflection—glass side | 23.3 |

Total solar radiation

| | Percent |
|---|---|
| Transmittance | 24.6 |
| Reflection—film side | 51.6 |
| Reflection—glass side | 35.7 |

EXAMPLE II

A 12 inch by 12 inch piece of nominal .125 inch thick ground and polished plate glass was cleaned and filmed in the same manner and under the same conditions defined in Example I. The vapor source in this case, however, was loaded with particles of an alloy consisting of 94.6 percent by weight gold, 3.4 percent by weight chromium and 2 percent by weight germanium. The deposition of this alloy was continued until a film thickness of 180 angstroms was obtained.

Visual inspection of the filmed glass sample showed no cracks or defects in the gold alloy film. The film successfully withstood a rubbing pressure considerably greater than that sufficient to remove a pure gold film deposited directly upon glass, and possessed the following optical properties:

Illuminant C

| | Percent |
|---|---|
| Transmittance | 40.3 |
| Reflection—film side | 33.0 |
| Reflection—glass side | 22.4 |

Total solar radiation

| | Percent |
|---|---|
| Transmittance | 25.6 |
| Reflection—film side | 49.5 |
| Reflection—glass side | 33.9 |

EXAMPLE III

An additional 12 inch by 12 inch piece of nominal .125 inch thick ground and polished plate glass was processed and filmed in exactly the same manner indicated in Examples I and II with the gold alloy film composition being the same as that employed in Example II, namely, 94.6 percent by weight gold, 3.4 percent by weight chromium and 2 percent by weight germanium. In this example, however, deposition of the gold alloy was continued until a film of 305 angstrom units in thickness was obtained. This filmed sample showed the same satisfactory physical properties as the samples of Examples I and II and possessed the following optical characteristics:

Illuminant C

| | Percent |
|---|---|
| Transmittance | 19.1 |
| Reflection—film side | 51.4 |
| Reflection—glass side | 38.5 |

Total solar radiation

| | Percent |
|---|---|
| Transmittance | 11.7 |
| Reflection—film side | 64.9 |
| Reflection—glass side | 46.7 |

While generally speaking, the visible light transmittance of this sample is lower than that of the majority of tinted heat rejecting glazings currently employed in architectural applications, the sample could be used to advantage in applications where a very low solar radiation transmittance is desirable and the low visible light transmittance would not be objectionable. Building skylights and automobile roof panels would be two such applications, as well as building viewing closures themselves in areas where excessive heat transmission and glare are particularly severe problems, for example in desert areas.

EXAMPLE IV

A 12 inch by 12 inch piece of nominal .125 inch thick ground and polished plate glass was washed with detergent and water and then cleaned with a chalk mixture and rubbed with clean cotton cloths. The resulting clean plate glass sample was placed in a vacuum chamber equipped with a high voltage discharge electrode, a glass heater, two electron beam evaporation sources including water cooled copper crucibles, and an optical monitoring system for controlling the thickness of the films during vacuum deposition thereon. The chamber was then evacuated to a pressure of 20 microns of mercury and the sample further cleaned at this pressure by ionic bombardment through the application of 2000 volts DC to the glow discharge electrode for 10 minutes. The vacuum chamber was then further evacuated to a $4 \times 10^{-5}$ torr. One of the crucible vapor sources which had been previously loaded with particles of an alloy consisting of 92 percent by weight gold, 4 percent by weight chromium and 4 percent by weight germanium and located 24 inches from the plate glass sample was then heated by activation of the electron beam source associated therewith, and through the use of the optical monitor a gold alloy film of approximately 185 angstroms was deposited on the glass. The glass temperature was maintained at 420° F. during the deposition by the glass heater.

The second vapor source which has been previously loaded with granulated silica and located approximately 24 inches from the glass sample was then heated by activation of the electron beam source associated therewith and the silica deposited onto the gold alloy filmed surface of the hot glass substrate to a thickness of 170 micro inches. This deposition required 12 minutes and was accomplished at a pressure of $5 \times 10^{-5}$ torr. During the deposition the temperature of the glass rose to 500° F. due to the heat radiated from the silica source.

The filmed glass sample was then allowed to cool, the pressure in the vacuum chamber was raised to ambient pressure, and the sample removed therefrom. Close visual inspection and handling of the filmed sample showed no cracks or defects in either the gold alloy film or the thick silica deposit. The filmed sample further showed no ill effects after being subjected to an accelerated weathering test in which the sample was continually exposed to the light of a carbon arc rich in ultraviolet rays and intermittently sprayed with salt water. The optical properties of the sample were determined to be as follows:

Illuminant C

| | Percent |
|---|---|
| Transmittance | 39.4 |
| Reflection—film side | 23.9 |
| Reflection—glass side | 22.1 |

Total solar radiation

| | |
|---|---|
| Transmittance | 27.1 |
| Reflection—film side | 33.0 |
| Reflection—glass side | 27.1 |

EXAMPLE V

A ground and polished plate glass sheet 36 inches by 36 inches by ¼ inch in thickness was cleaned, placed in a vacuum chamber, and heated and glow cleaned in the same manner recited in Example IV.

A gold alloy film consisting of 92 percent by weight gold, 4 percent by weight chromium and 4 percent by weight germanium was thereafter deposited on one surface of the glass plate from a titanium diboride crucible source heated by electron bombardment. The coating distance, i.e. the distance of the crucible from the glass sample was 71 inches, and the glass was maintained at a temperature of 380° F. by the glass heater. Deposition of the alloy was continued for 2 minutes at a pressure of $1 \times 10^{-5}$ torr with the thickness of the deposit, as controlled through the optical monitor, being approximately 150 angstroms.

After deposition of this gold alloy film, the plate glass sheet was moved by remote handling in front of a vapor source which had been previously loaded with granulated silica. The glass was located 34 inches from the silica vapor source. Upon activation of the electron guns associated with the silica source, silica was deposited on the gold alloy film at a pressure of $1.5 \times 10^{-5}$ torr to a thickness of 520 micro inches in 8 minutes. During deposition of the silica the temeperature of the glass rose from 365° F. to 370° F.

A close inspection revealed no cracks or other defects in either the gold alloy film or the thick silica deposit and the films proved very durable and weather resistant when subjected to rubbing pressure and accelerated weathering tests. The optical properties of the sample were as follows:

Illuminant C

| | Percent |
|---|---|
| Transmittance | 44.1 |
| Reflection—film side | 17.9 |
| Reflection—glass side | 16.0 |

Total solar radiation

| | |
|---|---|
| Transmittance | 28.5 |
| Reflection—film side | 27.6 |
| Reflection—glass side | 20.1 |

EXAMPLE VI

A ground and polished sheet of plate glass 12 inches by 12 inches by ⅛ inch in thickness was cleaned, placed in a vacuum chamber, and heated and glow cleaned in the manner defined in Example IV.

An alloy of 94 percent by weight gold, 3 percent by weight chromium and 3 percent by weight germanium, which had been melted previously in a vacuum and thereafter finely divided, was deposited on the glass sample by dropping the finely divided powdered alloy slowly, by remote control, onto a surface of a tungsten plate which was maintained at an elevated temperature by electron bombardment. The temperature of the tungsten plate was considerably above the melting point of the gold alloy, but below the melting point of the tungsten. Deposition of the film took place in 60 seconds at a pressure of $1.6 \times 10^{-5}$ torr and at a coating distance of 28 inches. The film thickness, as controlled by optical transmission, was 170 angstroms. The glass temperature during deposition was 200° F.

The filmed plate glass sample was then heated to 460° F. and a second vapor source, which previously had been loaded with granulated silica, heated by electron bombardment. A silica layer of 30 micro inches was deposited on the gold alloy film and hot glass substrate.

The resulting film of alloy and silica showed good adhesion and chemical stability; however, the abrasion resistance of the film was somewhat less than that of the film of Example V, including the thicker silica overcoat or protective layer. The optical properties of the sample were as follows:

ILLUMINANT C

| | Percent |
|---|---|
| Transmittance | 44.7 |
| Reflection—film side | 22.5 |
| Reflection—glass side | 22.1 |

Total solar radiation

| | |
|---|---|
| Transmittance | 30.8 |
| Reflection—film side | 38.0 |
| Reflection—glass side | 32.2 |

EXAMPLE VII

To further explore the effect of varying the composition of the gold alloy, another evaporation was made in precisely the same manner as set forth in Example VI but the composition of the powdered gold alloy evaporated in this instance was 94 percent by weight gold, 2 percent by weight chromium and 4 percent by weight germanium and the film thickness was 195 angstroms. The physical properties of the films were substantially the same as those of Example VI and the optical properties of the sample were as follows:

ILLUMINANT C

| | Percent |
|---|---|
| Transmittance | 40.5 |
| Reflection—film side | 27.0 |
| Reflection—glass side | 25.6 |

Total solar radiation

| | |
|---|---|
| Transmittance | 26.9 |
| Reflection—film side | 42.6 |
| Reflection—glass side | 35.2 |

EXAMPLE VIII

A ground and polished sheet of plate glass 36 inches by 30 inches by ¼ inch in thickness was cleaned, placed in a vacuum chamber, and heated and glow cleaned in the manner set forth in Example IV.

An alloy of 94 percent by weight gold, 2 percent by weight chromium and 4 percent by weight germanium, which has been melted previously in a vacuum and thereafter finely divided, was deposited on the glass sample by dropping the finely divided powdered alloy slowly, by remote control, onto a surface of a molybdenum plate which was heated by an electron beam and held just below the melting temperature of the molybdenum. Deposition of the film took place in 70 seconds at a pressure of $2 \times 10^{-5}$ torr and at a coating distance of 71 inches.

The film thickness was controlled through the optical monitor to 180 angstroms. The glass temperature during deposition was 300° F.

The filmed plate glass sample was next heated to 450° F. and then moved, by remote handling, to a distance of 34 inches from a second vapor source which previously had been loaded with granulated silica. The silica was heated by electron bombardment and deposited on the gold alloy film to a thickness of 500 micro inches in 6 minutes.

The resulting film of alloy and silica was extremely durable and exhibited good adhesion and chemical stability. The optical properties of the sample were as follows:

ILLUMINANT C

| | Percent |
|---|---|
| Transmittance | 48.1 |
| Reflection—film side | 18.9 |
| Reflection—glass side | 17.7 |

Total solar radiation

| | |
|---|---|
| Transmittance | 32.8 |
| Reflection—film side | 32.3 |
| Reflection—glass side | 24.5 |

While what has been described is considered to be the most advantageous embodiments of the invention, it will be apparent that modifications and variations can be made in the compositions and specific procedures discussed without departing from the spirit and scope of the present invention, as those skilled in the art will readily understand. Such modifications and variations are considered to be within the purview and scope of the invention as defined by the appended claims.

We claim:
1. A thin transparent light-modifying optical film comprising an alloy consisting essentially of from 88 to 98 percent by weight gold, from 1 to 6 percent by weight germanium and from 1 to 6 percent by weight chromium.
2. A transparent light-modifying optical film having a thickness in the range of 125 angstroms to 225 angstroms comprising an alloy consisting essentially of from 88 to 98 percent by weight gold, from 1 to 6 percent by weight germanium and from 1 to 6 percent by weight chromium.
3. A thin transparent light-modifying optical film comprising an alloy consisting essentially of from 92 to 96 percent by weight gold, from 2 to 4 percent by weight germanium and from 2 to 4 percent by weight chromium.

References Cited

UNITED STATES PATENTS 3,018,191    1/1962    Caban et al. _____ 171—71

GEORGE F. LESMES, Primary Examiner

J. P. BRAMMER, Assistant Examiner

U.S. Cl. X.R.

75—165